Feb. 20, 1934.    L. E. POOLE    1,947,659
FACING APPARATUS
Filed June 15, 1932    5 Sheets-Sheet 1

Fig.1    Fig.2

Inventor
LORA E. POOLE

Inventor
Lora E. Poole
Spencer Hardman and Fehr
Attorney

Feb. 20, 1934.  L. E. POOLE  1,947,659
FACING APPARATUS
Filed June 15, 1932  5 Sheets-Sheet 4

INVENTOR
LORA E. POOLE

By Spencer Hardman and S Ichs
Attorney

Fig. 7.

Patented Feb. 20, 1934

1,947,659

UNITED STATES PATENT OFFICE 1,947,659

FACING APPARATUS

Lora E. Poole, Anderson, Ind., assignor to Delco-Remy Corporation, Anderson, Ind., a corporation of Delaware Application June 15, 1932. Serial No. 617,310

30 Claims. (Cl. 82—2)

This invention relates to automatic lathes and more particularly to a lathe for facing a surface of a workpiece parallel to another plane surface previously formed on the workpiece.

This object is accomplished by providing a work-support which receives the previously formed plane surface of the workpiece, a device for clamping the workpiece upon the work support, a facing tool, means for causing relative linear movement between the clamped workpiece and the facing tool and means for causing relative rotary movement between the clamped workpiece and the facing tool.

Further objects and advantages of the present invention will be apparent from the following description, reference being had to the accompanying drawings wherein a preferred embodiment of one form of the present invention is clearly shown.

Figure 1:
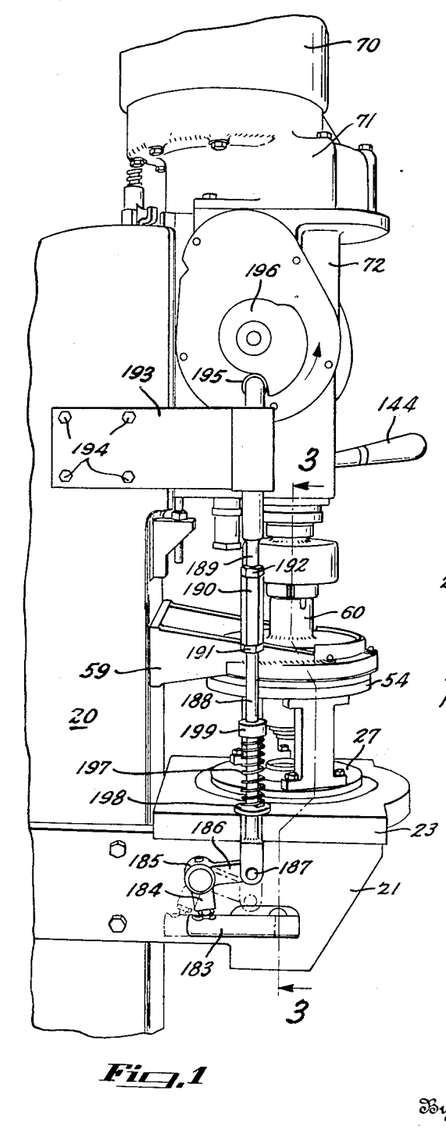
Fig. 1 is a fragmentary perspective view of a machine embodying the present invention.
Figure 2:
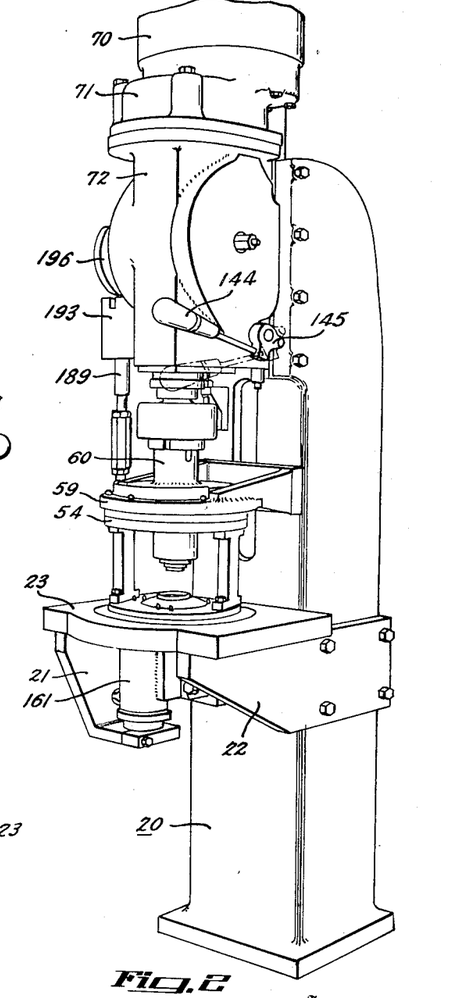
Fig. 2 is another perspective view of the same.
Figure 3:
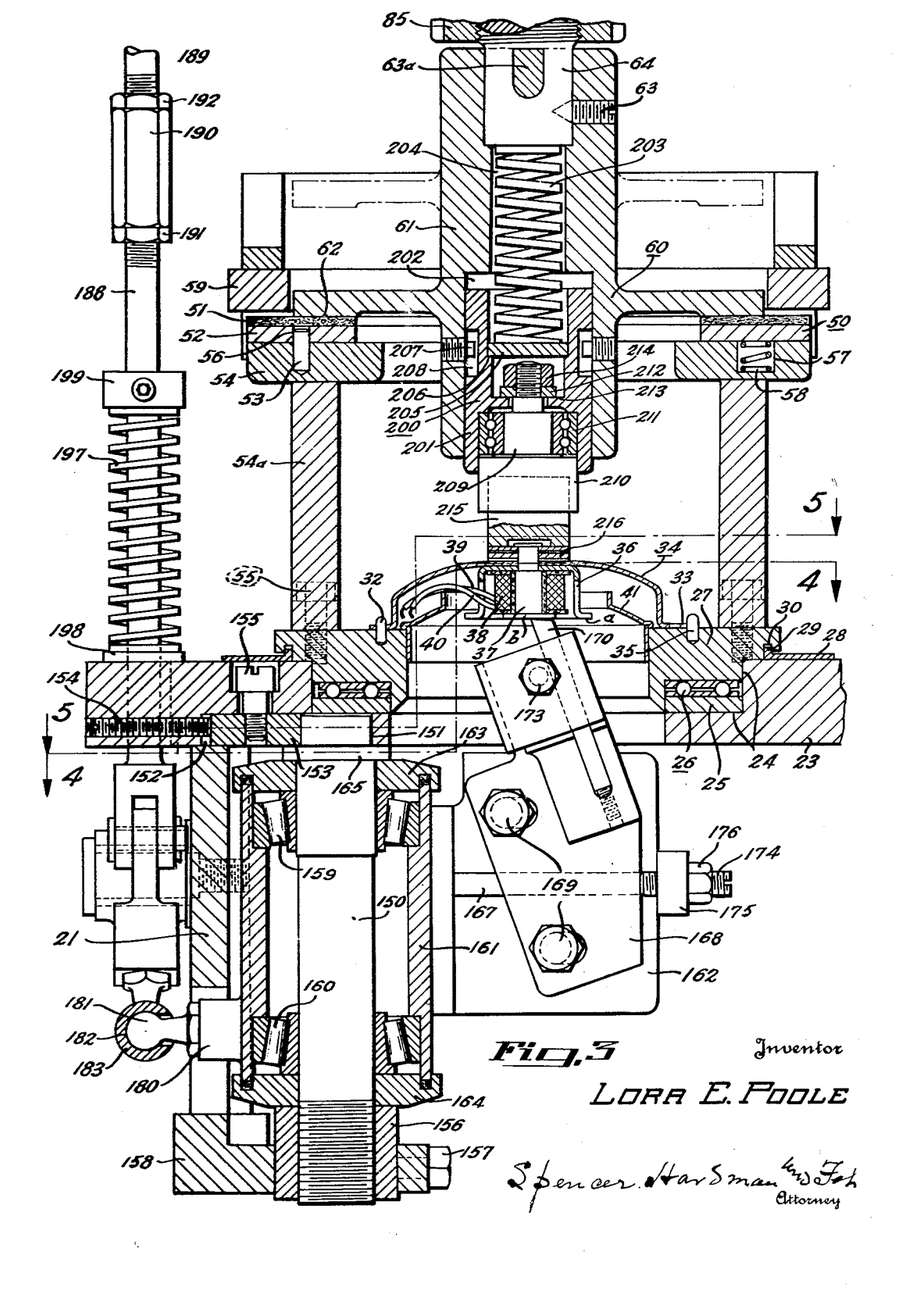
Fig. 3 is an enlarged fragmentary sectional view taken substantially on the line 3—3 of Fig. 1, and showing the clutch halves in driving engagement.
Figure 4:
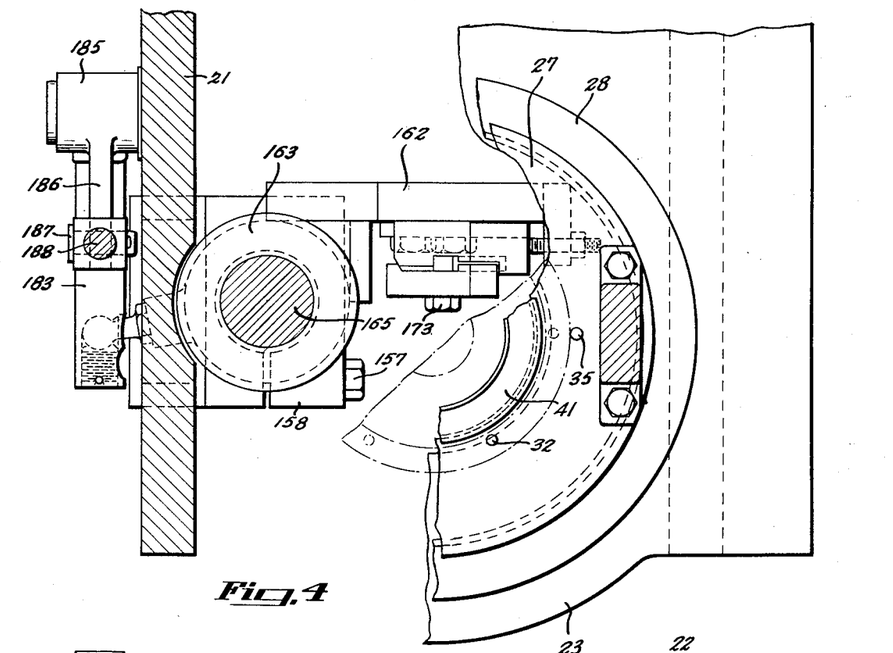
Fig. 4 is a section view taken on the line 4—4 of Fig. 3.
Figure 5:
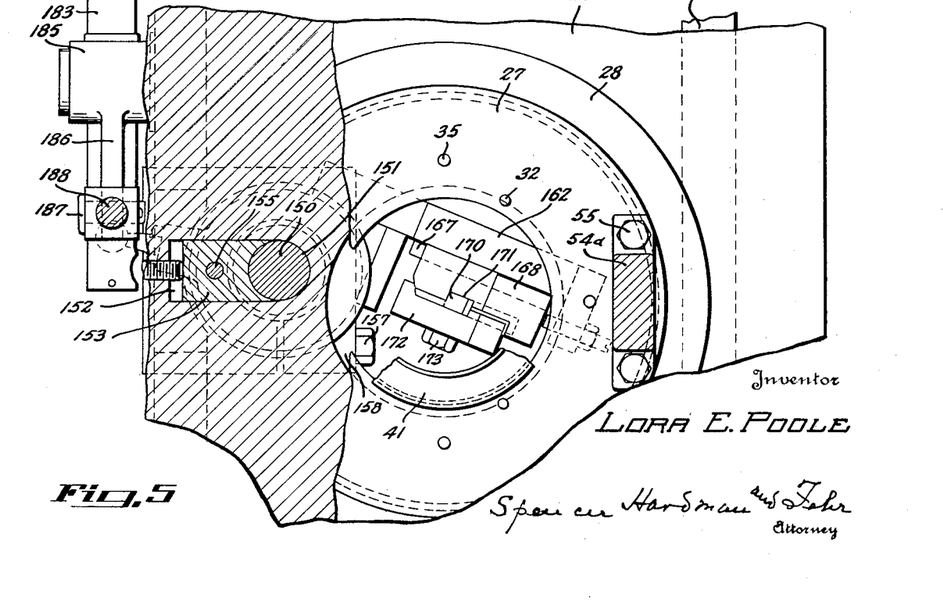
Fig. 5 is a fragmentary sectional view taken substantially along the line 5—5 of Fig. 3.

Referring more particularly to Figs. 1, 2 and 3 the reference numeral 20 constitutes a main frame carrying a pair of spaced brackets 21 and 22 on which is mounted in any suitable manner a table 23. Table 23 provides an annular recess 24 in which is located a steel ring 25 supporting a thrust ball bearing 26, which in turn rotatably supports a workpiece support 27, also located within annular recess 24. Workpiece support 27 is ring shaped and projects beyond thrust bearing 26 so as to prevent dust or chips from entering said bearing and lubricant from escaping from said bearing. An oil retainer ring 28 mounted on the table 23 projects with its annular ridge 29 into a corresponding groove 30 provided by worksupport 27 in order to prevent oil or any other suitable lubricant which is applied to lubricate the thrust bearing from escaping onto table 23 under centrifugal force resulting from the rapidly rotating workpiece support as will appear more fully later. Worksupport 27 carries a plurality of locating pins 32 adapted to project through holes in the flange 33 of a workpiece 34 which in the present case is a hornframe. The locating pins 32 drivingly connect the horn frame with the worksupport and also locate the same on the worksupport in such manner that the center axis of the horn frame aligns with the axis of rotation of the worksupport. A second set of auxiliary locating pins 35 is also carried by the worksupport, said pins abutting the periphery of said annular flange 33 thus facilitating the axial aligning of a horn frame with the work support. The operator first inserts a horn frame intermediate the auxiliary locating pins 35 and then rotates the same until the holes in the flange 33 align with the locating pins 32 whereupon the horn frame drops onto the worksupport and is then properly located on the rotary worksupport ready for a facing operation. The facing operation is to take place on the flush surfaces $a$ and $b$ of the magnet cup 36 and the magnet core 37, respectively, as best shown in Fig. 3. The surfaces $a$ and $b$ are concentric to the horn frame 34.

A magnet coil which is wound around the core and insulated therefrom starts and ends with wires 39 and 40 respectively, which spread from the winding. In order to prevent interferences of the spread wires with the facing tool during a facing operation, there is provided a guard 41 which is press fitted into the ring shaped worksupport 27 and which keeps said wires out of the path of movement of the facing tool.

In order to rotate the workpiece in unison with the worksupport relative to a facing tool, the worksupport comprises a driven clutch half 50 which is adapted to cooperate with a continuously rotated, reciprocable clutch half 60. The driven clutch half 50 comprises a clutch element 51 of any suitable material carried by a ring 52 which is drivingly connected by pins 53 with a ring 54 attached to and spaced from the worksupport 27 by two legs 54a in any suitable manner. The pins 53 are press fitted into ring 54 and are slidably received by holes 56 in ring 52. Located in equally spaced recesses 57 of ring 54 are a plurality of springs 58 which tend to move ring 52 with clutch element 51 away from the ring 54 and into engagement with a brake member 59 which as shown in Figs. 1 and 2 is attached to the main frame 20 in any suitable manner. The reciprocable clutch half 60 comprises a flanged member 61 which rough surface 62 is adapted to cooperate with clutch element 51. Clutch half 60 is movable from the dot and dash position as viewed in Fig. 3 to the full line position in the same figure, thereby engaging and moving clutch element 51 and ring 52 against the tendency of springs 58 out of engagement with brake member 59. Clutch half 60 is secured by a screw 63 and further are drivingly connected by a key 63a with a spindle 64 which may be rotated and reciprocated by mechanisms to be described presently.

*Mechanism for continuously rotating spindle*

Referring more particularly to Figs. 1, 2, and 6 to 11 inclusive, an electric motor 70 is shown mounted in any suitable manner on a housing 71 which forms a cap for a casing 72 which houses the mechanism to be described and is vertically adjustably carried by main frame 20. A gear 73 mounted on the armature shaft 74 meshes with a gear 75, keyed to a tubular sleeve 76 and held in position by a collar 77 threadedly engaging the end of the tubular sleeve 76 which is journaled in end thrust bearings 78 and 79. Spindle 64 is splined to the tubular sleeve 76 and is journaled with its lower end in a ball bearing 80. Endwise movement of spindle 64 relative to a quill 81 is prevented by a shoulder 82 integral with spindle 64 and resting against the inner race of ball bearing 80, a nut 83 which is threadedly received by the quill 81 and retains the outer race of said ball bearing in engagement with a shoulder 84 provided by said quill, and a nut 85 which is threaded over spindle 64 and retains collar 82 in firm engagement with the inner race of ball bearing 80. From this it may be seen that spindle 64 is rotatable whenever motor 71 is running, and it may also be understood that the spindle 64 continues to rotate even though it moves axially. Quill 81 may move longitudinally relative to casing 72 but is held non-rotatable by a key 81a, located in the casing 72 and projecting into a groove provided by the quill 81.

*Mechanism for reciprocating driving clutch half*

Figures 6, 12:
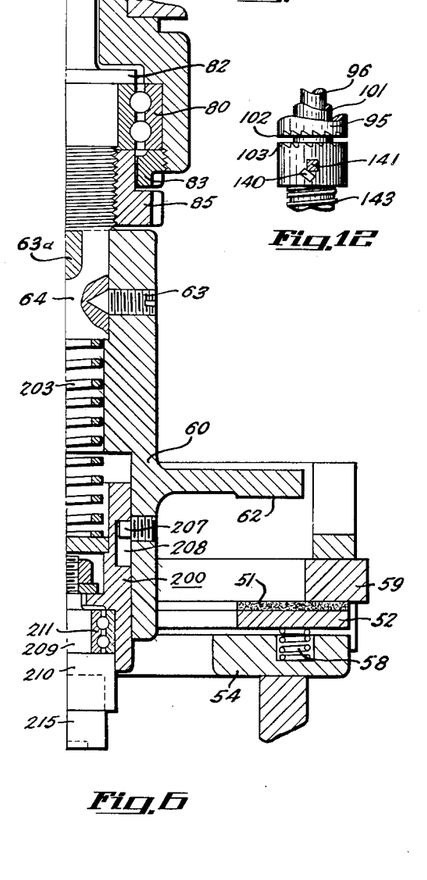
Fig. 6 is a fragmentary sectional view similar to a part of Fig. 3, showing, however, the clutch parts disconnected.
Fig. 12 is a fragmentary elevational view of a certain clutch in disconnected position.
Figure 7:
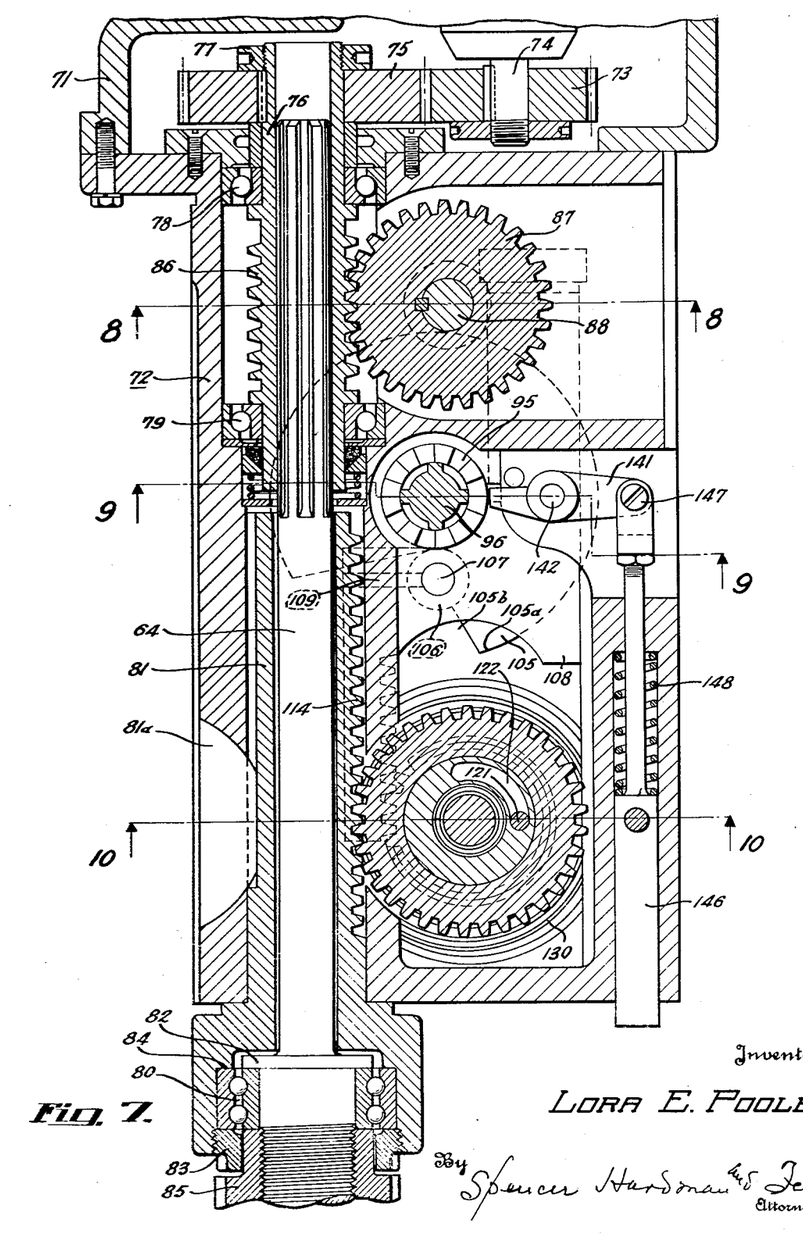
Fig. 7 is a fragmentary cross-sectional view through a mechanism for continuously rotating and optionally reciprocating the driving clutch half and is taken on the line 7—7 of Fig. 10.
Figure 8:
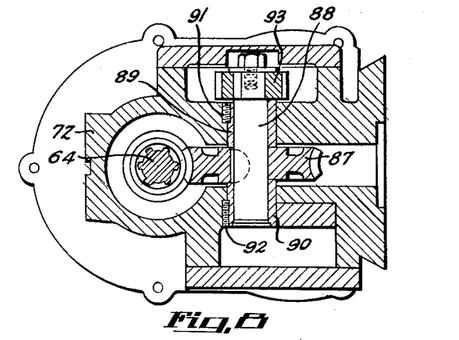
Fig. 8 is a reduced sectional view taken on the line 8—8 of Fig. 7.

Referring to Figs. 6 to 11 inclusive, the tubular sleeve 76 is provided with a worm 86 meshing with a worm gear 87 keyed to a shaft 88 (see Figs. 7 and 8) which is journaled in bearings 89 and 90 mounted on the casing 72 and held in position by screws 91 and 92, respectively. Shaft 88 carries a spur gear 93 which meshes with a gear 94 (see Fig. 9), keyed to a tubular member 95 rotatably mounted on a shaft 96 which is journaled in bearings 97 and 98, mounted in a gear retaining cap 99 and an end cover 100, respectively, each of which are attached to the casing 72 by suitable screws. Intermediate the tubular member 95 and shaft 96 is mounted a bushing 101. As best seen in Fig. 12 member 95 terminates in radial teeth 102 which cooperate with corresponding teeth 103 integral with a member 104 splined on shaft 96. Also splined on shaft 96 is a cam disc 105 which cooperates with a cam follower 106, mounted on a pin 107, carried by a rack 108 and held in position by a set screw 109. As the cam disc 105 rotates counterclockwise as viewed in Fig. 7, the rack 108 will be urged downwardly so as to feed spindle 64 and therewith clutch half 60 toward the work through a driving connection consisting of a gear member 110 rotatably mounted upon a shaft 111, which is meshing with gear teeth 112 on the rack 108. Gear member 110 cooperates with a gear member 113 which meshes with the gear teeth 114 provided therefor on the quill 81 to feed the spindle 64 downwardly as viewed in Fig. 7. Gear member 110 terminates in a frusto-conical external surface 115 which cooperates with a frusto-conical internal surface 116 of gear member 113 so as to permit adjustment of the distance of clutch half 60 from clutch element 51. Gear members 110 and 113 are held in frictional engagement by a nut 117 threadedly engaging the end of shaft 111, and by a shoulder 118 provided by a collar 119 integral with the shaft 111. Upon the loosening of the nut 117, gear member 113 is biased from gear member 110 by a helical spring 120 mounted on the shaft 111 and positioned in a recess in gear member 110. Adjustment of the spindle 64 is limited by a pin 121 carried by gear member 113 which travels in an arcuate slot 122 in gear member 110. As best seen in Fig. 7, gear members 110 and 113 are limited in their relative annular movement by the length of slot 122. The end of shaft 111 terminates in a square portion 123 which permits the operator to adjust spindle 64 without dismantling the machine.

Figure 10:
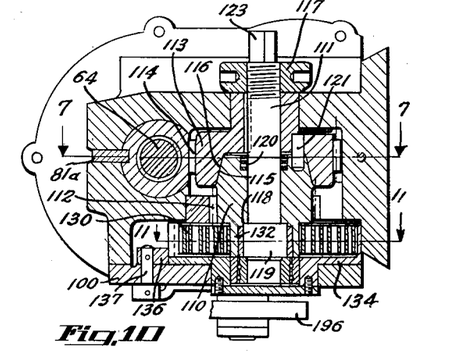
Fig. 10 is a reduced sectional view taken on the line 10—10 of Fig. 7.
Figure 11:
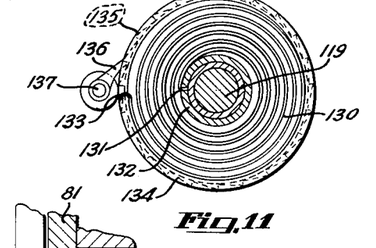
Fig. 11 is a sectional view taken on the line 11—11 of Fig. 10.

The mechanism for retracting spindle 64 from the workpiece comprises, as best seen in Figs. 10 and 11, a spiral spring 130 which has a hooked end 131 engaging a recess provided therefor in a cylindrical portion 132 of gear member 110, and a hooked end 133 engaging a recess in a cup-shaped member 134 which is rotatably mounted in the end frame 100. In order to adjust the tension of the spring 130, member 134 has been provided with a ratchet 135 which cooperates with a pawl 136 mounted on a pin 137 which is carried by the end cover 100. The spring 130 which has been even more compressed during the downward movement of spindle 64 urges the spindle 64 and therewith clutch half 60 away from the clutch element 51 and the cam follower 106 upwardly as viewed in Fig. 7 when the latter has passed the concentric portion 105a of the cam 105 during its counterclockwise rotation and is free to move into the depression 105b of said cam.

Figure 9:
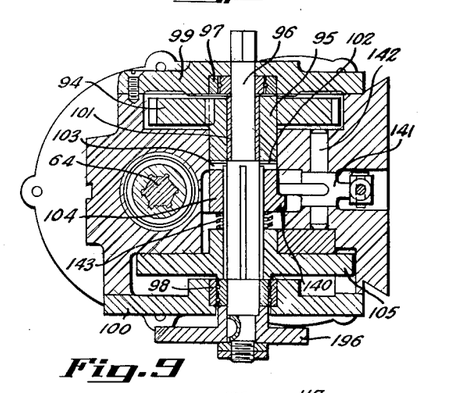
Fig. 9 is a reduced sectional view taken on the line 9—9 of Fig. 7.

A device has been provided to stop the mechanism from reciprocating spindle 64 again after it has been retracted to the position as viewed in Fig. 7. This stopping device consists of a cam projection 140 integral with member 104, which engages a releasing lever 141 mounted on a pivot 142 carried by the frame 72. In Figs. 7, 9 and 12 it may be seen that as the cam projection 140 strikes the lever 141, member 104 will be biased against the force of a helical spring 143 so as to disengage the radial teeth 102 and 103, whereby member 95 will rotate without rotating member 104 and the parts driven thereby. When the operator desires to have the spindle 64 reciprocated he rocks a handle 144 from the full line position as shown in Fig. 2 to the dot and dash line position in the same figure, thereby rocking a short lever 145 which is pivoted to the frame 72 and also pivoted to an actuating rod 146 which as shown in Fig. 7 is also pivotally connected as at 147 with releasing lever 141. Rocking of the handle 144 in the predescribed manner effects movement of the rod 146 upwardly as viewed in Fig. 7 against the tension of a spiral spring 148 and counterclockwise rotation of the releasing lever 141 which during such movement disengages from the cam projection 140, whereupon member 104 is moved under spring action into driving engagement with member 95. The operator naturally has to release handle 144 in the dot and dash position in Fig. 2 before the end of one complete revolution of shaft 96, whereupon rod 146 and releasing lever 141 are returned by spring 148 into the position shown in Fig. 7, in which position the releasing lever engages the cam projection 140 after one complete revolution of shaft 96 and withdraws toothed member 104 from driving engagement with toothed member 95.

Facing operation

Referring more particularly to Figs. 1 to 5 inclusive, there is shown a spindle 150 the upper end of which is clamped against the semi-circular side wall 151 of a groove 152 in the table 23 by a clamping block 153 which may be adjusted within groove 152 by a screw 154 threaded through table 23, and locked in adjusted position by a screw 155. The lower end of spindle 150 is threadedly received by a cylindrical block 156 which is clamped by a screw 157 to a split bearing member 158 integral with table carrying bracket 21. In this manner the spindle 150 is held non-rotatable and prevented from longitudinal movement in any direction as can be readily understood. Mounted on spindle 150 are spaced tapered roller bearings 159 and 160 which rotatably support the tubular boss 161 of a reciprocable bracket 162. Cover plates 163 and 164 close the tubular boss 161 and rest against a collar 165 of spindle 150 and against cylindrical block 156 respectively, thus also preventing longitudinal movement of bracket 162 relative to the spindle 150. Bracket 162 is provided with a rectangular ridge 167 adapted to project into the corresponding groove of a tool carrying bracket 168 which is adjustably secured to bracket 162 by screws 169 extending through slots in bracket 168 and threaded into bracket 162. A facing tool 170 is located in a rectangular groove 171 provided by bracket 168 and firmly held in properly adjusted position within said groove by an overlying retainer plate 172 which is secured to bracket 168 by screw 173. Bracket 162 is adapted to be rocked about spindle 150 so that tool 170 moves past the flush surfaces a and b of the magnet cup 36 and the magnet core 37 respectively. In order that the tool passes through the common center of these surfaces, tool carrying bracket 168 may be adjusted radially with respect to its movement by loosening screws 169 and bodily moving bracket 168 parallel to the ridge 167 either by hand away from spindle 150 or by an adjusting screw 174 toward the spindle. Adjusting screw 174 is threaded through a lug 175 of bracket 162 and the parts carried thereby will now be described detailedly with special reference to Figs. 1, 3, 4, 5 and 9. Attached to the tubular boss 161 of bracket 162 in any suitable manner is an arm 180 the ball shaped end 181 of which is received within a socket 182 provided by a cylindrical bar 183 which provides also another socket in which is received the ball shaped end of an arm 184 of a bell crank lever 186 which is pivotally mounted on bracket 21. The other arm 186 of bell crank lever 185 is pivotally connected as at 187 with a rod 188 which is adjustably connected with another rod 189 by an interiorly threaded sleeve 190 receiving the threaded ends of rods 188 and 189 which are locked in adjusted position therein by nuts 191 and 192 respectively. Rod 189 is guided for vertical movement through a bushing located in a bracket 193 which is attached to the main frame 20 by screws 194. The uppermost end of rod 189 carries an antifriction roller 195 adapted to cooperate with a cam disc 196 (see also Fig. 9) which is mounted on shaft 96. A spring 197 surrounding rod 188 and resting with one end against a washer 198 on the table 23 and with the other end against a collar 199 adjustably mounted on rod 188, urges rods 188 and 189 upwardly as viewed in Fig. 1, thereby yieldingly maintaining anti-friction roller 195 in engagement with cam disc 196. Rotation of cam disc 196 results in movement of rods 189 and 188 downwardly, rocking of bell crank lever 185 in clockwise direction, movement of cylindrical bar 183 toward the left all as viewed in Fig. 1, and rocking of bracket 162 from the position shown in Fig. 4 to that shown in Fig. 5, during which movement of bracket 162, tool 170 performs a facing operation. Cam disc 196 is so designed that the rocking motion of bracket 162 in the described direction ceases when tool 170 reaches the common center of the surfaces of the workpiece, and cam disc 196 then permits rods 189 and 188 to move upwardly as viewed in Fig. 1, under the action of spring 197, which effects movement of the bracket 162 and parts carried thereby from the position shown in Fig. 5 to that shown in Fig. 4, in which position the tool is out of operative engagement with the workpiece.

Means for retaining workpiece on support during facing operation

As can be readily understood from Fig. 3, the tool 170 while operating upon the flush surfaces a and b imparts a thrust to the workpiece which tends to raise the same from the support. In order to prevent the slightest removal of the workpiece from the support during a facing operation there is provided a yielding plunger 200 which is movable with the clutch half 60. This plunger comprises a tubular member 201 which is slidable within an annular recess 202 of the flanged member 61. A spring 203, located within a recess 204 of member 61 and within the tubular member 201 rests with one end against spindle 64 and with the other end against a disc 205 which in turn rests against a shoulder 206 provided by tubular member 201. Spring 203 which is under compression tends to move said tubular member downwardly as viewed in Fig. 3, such movement is, however, limited by pins 207 threaded into the flanged clutch member 61 and projecting into oblong grooves 208 provided by tubular member 201. The shank 209 of a cup shaped member 210 is journaled in a ball bearing 211 located in tubular member 201, and is prevented from longitudinal movement relative to said tubular member by a washer 212 and a nut 214 which is threaded over the end of shank 209 and maintains cup shaped member 210 and ball bearing 211 in firm engagement with each other and the latter in engagement with a shoulder 213 of the tubular member. Located within the cup shaped member 210 is a workpiece retaining block 215 of any suitable material which bears against the reinforcing washers 216 of the horn frame 34. During the movement of clutch half 60 toward clutch element 51, the workpiece retaining block 215 will first engage the reenforcing washers 216 before clutch half 60 drivingly engages clutch element 51. It is also evident that upon engagement of the retaining block 215 with the reenforcing washers, the same will not rotate due to its ball bearing support in tubular member 201, thereby preventing unnecessary wearing down of retainer block 215.

Mode of operation

It may be presumed that the various mechanisms of the apparatus are in normal resting position and it is desired to perform a facing operation. The operator places and locates a workpiece on the support in the earlier described manner, starts motor 70 and then rocks handle 144 from the full line position to the dot and dash position as viewed in Fig. 2. The last described manipulation of the operator effects driving engagement between toothed members 95 and 104 and therefore rotation of cam 105 in counter-clockwise direction as viewed in Fig. 7, which results in downward movement of spindle 64 and clutch half 60 into driving engagement with clutch element 51. During such movement of clutch half 60 block 215 engages the reenforcing washer 216 of a horn frame 34 on support 27 and yieldingly maintains the same on the support. Cam disc 196 which is mounted on the same shaft 96 as cam 105 and therefore rotates in unison with the latter cam, is so designed that it effects a quick movement of tool 170 from a most retracted position as viewed in Fig. 4 to adjacent unfaced surface *a* while clutch half 60 moves into driving engagement with clutch element 51. As soon as clutch half 60 is in driving engagement with clutch element 51 as governed by the riding of anti-friction roller 106 over the concentric cam portion 105*a*, cam disc 196 effects a slower movement of tool 170 over the surfaces *a* and *b* during which movement the facing operation takes place. As soon as the facing tool reaches the common center of the surfaces *a* and *b*, cam disc 196 allows spring 197 quickly to return into most retracted position so as to prevent spiral marks to be left on the faced surfaces *a* and *b* by the retracing tool. Immediately after the retraction of the facing tool, cam roller 106 has passed the concentric portion 105*a* of cam 105 and is moved by the wound-up spring 130 into the cam depression 105*b*, which movement of the cam roller results in a withdrawal of the clutch half 60 from driving engagement with clutch element 51 into the position shown in Fig. 7. Clutch element 51 follows the withdrawing clutch half 60 under the action of springs 58 until engaged by brake member 59 whereupon the work support and the parts carried thereby immediately cease to rotate. The meanwhile released handle 144 has been returned by spring 148 from the dot and dash position into the full line position as shown in Fig. 2, in which position releasing lever 141 obstructs and finally engages cam projection 140 at the end of one complete revolution of cam carrying shaft 96. Such engagement results in disconnection of the toothed members 95 and 104 whereupon the cams 105 and 196 cease to rotate as earlier explained. The operator then removes the workpieces from the support and places another one thereon ready for the next facing operation which takes place in exactly the same manner as just described.

It will be apparent from the preceding description that the lathe is a combination of a work-support which is engaged by a previously formed plane surface of the workpiece, a facing tool which is moving substantially linear in a plane parallel to said previously formed surface of the workpiece when resting upon the work-support, a device for clamping the workpiece upon the work-support, and means for causing relative rotary movement between the clamped workpiece and the tool whereby the latter performs a facing operation.

While the form of embodiment of the present invention as herein disclosed, constitutes a preferred form, it is to be understood that other forms might be adopted, all coming within the scope of the claims which follow.

What is claimed is as follows:

1. A lathe for facing one plane surface of a workpiece parallel to another plane surface thereof, both of said surfaces being on the same side of a workpiece and said other surface surrounding said one surface, comprising, in combination, a work support engaging and locating said surrounding plane surface of the workpiece; a facing tool; means for causing substantially relative linear movement between the worksupport and the tool in a plane parallel to said surrounding plane surface of the workpiece; and means for causing relative rotary movement between the worksupport and the facing tool.

2. A lathe for facing one plane surface of a workpiece parallel to another plane surface thereof, both of said surfaces being on the same side of a workpiece and said other surface surrounding said one surface, comprising, in combination, a worksupport engaging and locating said surrounding plane surface of the workpiece; a facing tool movable substantially linearly in a plane parallel to said surrounding plane surface; means for moving the facing tool in said plane; and means for causing relative rotary movement between the worksupport and the facing tool.

3. A lathe for facing one plane surface of a workpiece parallel to another plane surface thereof, both of said surfaces being on the same side of a workpiece and said other surface surrounding said one surface, comprising, in combination, a rotary worksupport engaging and locating said surrounding plane surface of the workpiece; a facing tool; means for causing substantially relative linear movement between the worksupport and the tool in a plane parallel to said surrounding plane surface of the workpiece; and means for rotating the worksupport.

4. A lathe for facing one plane surface of a workpiece parallel to another plane surface thereof, both of said surfaces being on the same side of a workpiece and said other surface surrounding said one surface, comprising, in combination, a worksupport engaging and locating said surrounding plane surface of the workpiece; a facing tool movable substantially linearly in a plane parallel to said surrounding plane surface means for moving the facing tool in said plane; a device for clamping the workpiece upon the worksupport; and means for causing relative rotary movement between the worksupport and the facing tool.

5. A lathe for facing one plane surface of a workpiece parallel to another plane thereof, both of said surfaces being on the same side of a workpiece and said other surface surrounding said one surface, comprising, in combination, a worksupport engaging and locating said surrounding plane surface of the workpiece; a facing tool; means for causing substantially relative linear movement between the worksupport and the tool in a plane parallel to said surrounding plane surface of the workpiece; a device for clamping the workpiece upon the worksupport; and means for causing relative rotary movement between the worksupport and the facing tool.

6. A lathe for facing one plane surface of a workpiece parallel to another plane thereof, both of said surfaces being on the same side of a workpiece and said other surface surrounding said one surface, comprising, in combination, a rotary worksupport engaging and locating said surrounding plane surface of the workpiece; a facing tool; means for causing substantially relative linear movement between the worksupport and the tool in a plane parallel to said surrounding plane surface of the workpiece; a device for clamping the workpiece upon the worksupport; and means for rotating the worksupport.

7. A lathe for facing a flat surface of a workpiece comprising, in combination, a rotatable workpiece support including means for locating a workpiece thereon and drivingly connecting the same with the support; continuously rotating reciprocable means adapted drivingly to engage with and disengage from the support; a facing tool; and means for causing substantially relative linear movement between the driven worksupport and the tool in a plane parallel to the surface to be faced.

8. A lathe for facing a flat surface of a workpiece comprising, in combination, a rotatable workpiece support including means for locating a workpiece thereon and drivingly connecting the same with the support; continuously rotating, reciprocable means adapted drivingly to engage with and disengage from the support; and a bodily movable tool.

9. A lathe for facing a flat surface of a workpiece comprising, in combination, a rotatable workpiece support including means for locating a workpiece thereon and drivingly connecting the same with the support; rotatable and reciprocable means adapted drivingly to engage the support; a reciprocable tool; and means actuated in response to driving engagement of the driving means with the support for moving the tool over said flat surface of the workpiece thereby performing a facing operation.

10. A lathe for facing a flat surface of a workpiece comprising, in combination, a rotatable workpiece support including means for locating a workpiece thereon and drivingly connecting the same with the support; continuously rotating reciprocable means adapted drivingly to engage the support; a mechanism for reciprocating the support driving means into and from driving engagement with the support; a facing tool; and means actuated in response to operation of the mechanism for causing substantially relative linear movement between the driven worksupport and the tool in a plane parallel to the surface to be faced.

11. A lathe for facing a flat surface of a workpiece comprising, in combination, a rotatable workpiece support including means for locating a workpiece thereon and drivingly connecting the same with the support; continuously rotating reciprocable means adapted drivingly to engage the support; a mechanism for reciprocating the support driving means into and out of driving engagement with the support; a bodily movable tool; and means actuated in response to operation of the mechanism for bodily moving the tool.

12. A lathe for facing a flat surface of a workpiece comprising, in combination, a rotatable workpiece support providing a clutch half and including means for locating a workpiece on the support and drivingly connecting the workpiece with the same; a driving reciprocable clutch half adapted drivingly to engage with and disengage from the cooperating clutch half of the support, said driving clutch half including means adapted yieldingly to exert pressure upon a workpiece on the support when the clutch halves drivingly engage each other and said means being rotatable relative to said driving clutch half; and a bodily movable tool.

13. A lathe for facing a flat surface of a workpiece comprising, in combination, a rotatable workpiece support providing a clutch half and including means for locating a workpiece on the support and drivingly connecting the workpiece with the same; a driving, reciprocable clutch half adapted drivingly to engage with and disengage from the cooperating clutch half of the support, said driving clutch half including means adapted yieldingly to exert pressure upon a workpiece on the support when the clutch halves drivingly engage each other and said means being rotatable relative to the driving clutch half; a reciprocable tool; and means actuated in response to driving engagement of the clutch halves for moving the tool over said flat surface of the workpiece thereby performing a facing operation.

14. A lathe for facing a flat surface of a workpiece comprising, in combination, a rotatable workpiece support including means for locating a workpiece thereon and drivingly connecting the same with the support; a clutch half drivingly connected with the support and yieldingly spaced therefrom; a rotary reciprocable clutch half adapted drivingly to engage the cooperating clutch half of the support; a prime mover; means drivingly connecting the prime mover with the reciprocable clutch half to rotate the same; a one revolution mechanism for moving the reciprocable clutch half into driving engagement with the clutch half of the support and for maintaining the clutch halves in driving engagement during a predetermined cycle of operation of said mechanism; a bodily movable tool; means for actuating the mechanism; and means for bodily moving the tool over said flat surface of the workpiece in response to said predetermined cycle of operation of the one revolution mechanism.

15. A lathe for facing a flat surface of a workpiece comprising, in combination, a rotatable workpiece support including means for locating a workpiece thereon and drivingly connecting the same with the support; a clutch half drivingly connected with the support and yieldingly spaced therefrom; a rotary reciprocable clutch half adapted drivingly to engage the cooperating clutch half of the support and including means adapted yieldingly to retain a workpiece on the support when the clutch halves drivingly engage each other and said means being rotatable relative to the reciprocable clutch half; a prime mover; means drivingly connecting the prime mover with the reciprocable clutch half to rotate the same; a one revolution mechanism for moving the reciprocable clutch half into driving engagement with the clutch half of the support and for maintaining the clutch halves in driving engagement during a predetermined cycle of operation of said mechanism; a bodily movable tool; means for actuating the mechanism; and means for bodily moving the tool over said flat 16. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; means on said shaft for moving the reciprocable clutch half into driving engagement with the other clutch half and maintaining both clutch halves in driving engagement; a spring urging the reciprocable clutch half away from the other clutch half; a facing tool; an oscillatable bracket carrying the tool; and means operated by the shaft for oscillating the bracket to effect movement of the tool over the flat surface of a workpiece thereby performing a facing operation.

17. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; a cam on said shaft for moving the reciprocable clutch half into driving engagement with the other clutch half and for maintaining both clutch halves in driving engagement during a predetermined cycle of rotation of the shaft; a spring urging the reciprocable clutch half away from the other clutch half; a facing tool; an oscillatable bracket carrying the tool; and means operated by the shaft for oscillating the bracket to effect movement of the tool over said flat surface of the workpiece thereby performing a facing operation.

18. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; a cam on said shaft for moving the reciprocable clutch half into driving engagement with the other clutch half and for maintaining both clutch halves in driving engagement during a predetermined cycle of rotation of the shaft; a spring urging the reciprocable clutch half away from the other clutch half; a facing tool; an oscillatable bracket carrying the tool; and means on the shaft for oscillating the bracket to effect movement of the tool over said flat surface of the workpiece thereby performing a facing operation.

19. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; means on said shaft for moving the reciprocable clutch half into driving engagement with the other clutch half and for maintaining both clutch halves in driving engagement; a spring urging the reciprocable clutch half away from the other clutch half; a facing tool; an oscillatable bracket carrying the tool; and means including a cam on the shaft for oscillating the bracket to effect movement of the tool over said flat surface of the workpiece thereby performing a facing operation during a predetermined cycle of rotation of the shaft.

20. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; means operated by said shaft for moving the reciprocable clutch half into driving engagement with the other clutch half and for maintaining both clutch halves in driving engagement; a spring urging the reciprocable clutch half away from the other clutch half; a facing tool; an oscillatable bracket carrying the tool; a linkage for reciprocating the bracket; a cam on the shaft for actuating the linkage so as to effect movement of the tool over said flat surface of the workpiece thereby performing a facing operation, said cam also controlling oscillation of the bracket into inoperative position during one complete revolution of the shaft; and a spring urging the linkage to effect movement of the tool into inoperative position.

21. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; a cam on said shaft for moving the reciprocable clutch half into driving engagement with the other clutch half and for maintaining both clutch halves in driving engagement with each other during a predetermined cycle of rotation of the shaft; a spring urging the reciprocable clutch half away from the other clutch half; a facing tool; an oscillatable bracket carrying the tool; a linkage for oscillating the bracket; a cam on the shaft for actuating the linkage so as to effect movement of the tool over said flat surface of the workpiece thereby performing a facing operation during a predetermined cycle of rotation of the shaft; and a spring urging the linkage to effect movement of the tool into inoperative position.

22. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; a cam on said shaft for moving the reciprocable clutch half into driving engagement with the other clutch half, for maintaining both clutch halves in driving engagement and for controlling the retraction of the reciprocable clutch half from the cooperating half during one complete revolution of the shaft; a spring urging the reciprocable clutch half away from the other clutch half; a facing tool; an oscillatable bracket carrying the tool; a linkage for oscillating the bracket; a cam on the shaft for actuating the linkage so as to effect movement of the tool over said flat surface of the workpiece thereby performing a facing operation, and for controlling the movement of the tool into inoperative position during one complete revolution of the shaft; and a spring urging the linkage to effect movement of the tool into inoperative position.

23. A lathe for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; means on said shaft for moving the reciprocable clutch half into driving engagement with the other clutch half and for maintaining both clutch halves in driving engagement; a spring urging the reciprocable clutch half away from the other clutch half; a facing tool; an oscillatable bracket carrying the tool; a linkage for oscillating the bracket; means actuated in response to rotation of the shaft for actuating the linkage so as to effect movement of the tool over said flat surface of the workpiece thereby performing a facing operation; and a spring urging the linkage to effect movement of the tool into inoperative position.

24. A machine for facing a flat surface of a workpiece comprising, in combination, a rotatable workpiece support including means for locating a workpiece thereon and for drivingly connecting the same with the support; a clutch half carried by the support; a reciprocable clutch half adapted drivingly to engage the clutch half of the support; an electric motor drivingly connected with the reciprocable clutch half for rotating the same; a rotatable shaft; a cam on said shaft for moving the reciprocable clutch half into driving engagement with the other clutch half, for maintaining both clutch halves in driving engagement and for controlling the retraction of the reciprocable clutch half from the cooperating half during one complete revolution of the shaft; a spring urging the reciprocable clutch half away from the other clutch half, a facing tool; an oscillatable bracket carrying the tool; a linkage for oscillating the bracket; a cam on the shaft for actuating the linkage so as to effect movement of the tool over said flat surface of the workpiece thereby performing a facing operation, and for controlling the movement of the tool into inoperative position during one complete revolution of the shaft; a spring urging the linkage to effect movement of the tool into inoperative position; a normally inoperative device for drivingly connecting the electric motor with the shaft for one complete revolution of the latter only; and manually operable means for rendering the device operative.

25. A lathe for facing a flat surface of a workpiece comprising, in combination, a rotatable workpiece support including means for locating a workpiece thereon and drivingly connecting the same with the support; a brake member; driven means rotatable with the support and yieldingly urged away therefrom into engagement with the brake member; continuously rotating reciprocable means adapted drivingly to engage the driven means and to move the same out of engagement with the brake member; a facing tool; and means for causing substantially relative linear movement between the driven worksupport and the tool in a plane parallel to the surface to be faced.

26. A lathe for facing a flat surface of a workpiece comprising, in combination, a rotatable workpiece support including means for locating a workpiece thereon and drivingly connecting the same with the support; a brake member; driven means rotatable with the support and yieldingly urged away therefrom into engagement with the brake member; continuously rotating reciprocable means adapted drivingly to engage the driven means and to move the same out of engagement with the brake member; a mechanism for reciprocating the support driving means into and from driving engagement with the driven means; a facing tool; and means actuated in response to operation of the mechanism for causing substantially relative linear movement between the driven worksupport and the tool in a plane parallel to the surface to be faced.

27. A lathe for facing a flat surface of a workpiece comprising, in combination, a rotatable workpiece support including means for locating a workpiece thereon and drivingly connecting the same with the support; a stationary brake member; a clutch half drivingly connected with the support and yieldingly urged into engagement with the brake member; a driving, reciprocable clutch half adapted drivingly to engage the cooperating clutch half of the support and including means adapted yieldingly to exert pressure upon a workpiece to maintain the same on the support when the clutch halves drivingly engage each other, said means being rotatable relative to the driving clutch half and said driving clutch half when moved into driving engagement with the other clutch half moving the latter out of engagement with the brake member against its tendency to engage said brake member, and a bodily movable tool.

28. A lathe for facing a flat surface of a workpiece comprising, in combination, a rotatable workpiece support including means for locating a workpiece thereon and drivingly connecting the same with the support; a stationary brake member; a clutch half drivingly connected with the support and yieldingly urged into engagement with the brake member; a driving, reciprocable clutch half adapted drivingly to engage the cooperating clutch half of the support and including means adapted yieldingly to exert pressure upon a workpiece to maintain the same on the support when the clutch halves drivingly engage each other, said means being rotatable relative to said driving clutch half and said driving clutch half when moved into driving engagement with the other clutch half moving the latter out of engagement with the brake member against its tendency to engage said brake member; a reciprocable tool; and means actuated in response to driving engagement of the clutch halves for moving the tool over said flat surface of the workpiece thereby performing a facing operation.

29. A lathe for facing a flat surface of a workpiece comprising, in combination, a rotatable workpiece support including means for locating a workpiece thereon and drivingly connecting the same with the support; a stationary brake member; a clutch half drivingly connected with the support and yieldingly urged into engagement with the brake member; a rotary reciprocable clutch half adapted drivingly to engage the cooperating clutch half of the support; a prime-mover; means drivingly connecting the prime-mover with the reciprocable clutch half to rotate the same; a one revolution mechanism for moving the reciprocable clutch half into driving engagement with the clutch half of the support and for maintaining the clutch halves in driving engagement during a predetermined cycle of operation of said mechanism, said reciprocable clutch half when drivingly engaging the other clutch half moving the same out of engagement with the brake member; a bodily movable tool; means for actuating the mechanism; and means for bodily moving the tool over said flat surface of the workpiece in response to said predetermined cycle of operation of the one revolution mechanism.

30. A lathe for facing a flat surface of a workpiece comprising, in combination, a rotatable workpiece support including means for locating a workpiece thereon and drivingly connecting the same with the support; a stationary brake member; a clutch half drivingly connected with the support and yieldingly urged into engagement with the brake member; a rotary reciprocable clutch half adapted drivingly to engage the cooperating clutch half of the support and including means adapted yieldingly to retain a workpiece on the support while the clutch halves drivingly engage each other and said means being rotatable relative to the reciprocable clutch half; a prime-mover; means drivingly connecting the prime-mover with the reciprocable clutch half to rotate the same; a one revolution mechanism for moving the reciprocable clutch half into driving engagement with the clutch half of the support and for maintaining the clutch halves in driving engagement during a predetermined cycle of operation of said mechanism, said reciprocable clutch half when drivingly engaging the other clutch half moving the same out of engagement with the brake member; a bodily movable tool; means for actuating the mechanism; and means for bodily moving the tool over said flat surface of the workpiece to perform a facing operation in response to said predetermined cycle of operation of the one revolution mechanism.

LORA E. POOLE.